United States Patent [19]

Kneifel, II et al.

[11] Patent Number: 4,719,397
[45] Date of Patent: Jan. 12, 1988

[54] METHOD AND APPARATUS FOR TAPE DISPENSING SERVO TRACKING CONTROL

[75] Inventors: Ralph W. Kneifel, II, Cincinnati; David C. Swope, North Bend, both of Ohio

[73] Assignee: Cincinnati Milacron Inc., Cincinnati, Ohio

[21] Appl. No.: 34,887

[22] Filed: Apr. 6, 1987

[51] Int. Cl.$^4$ ............................................. G05B 19/100
[52] U.S. Cl. ...................................... 318/567; 318/571; 364/479
[58] Field of Search ............... 318/568, 567, 609, 610, 318/570, 571, 572, 573, 574, 625; 364/168, 479

[56] References Cited

U.S. PATENT DOCUMENTS

| | | | |
|---|---|---|---|
| 4,125,943 | 11/1978 | Ando | 318/568 |
| 4,571,686 | 2/1986 | Torisawa | 318/570 X |
| 4,602,540 | 7/1986 | Murofushi et al. | 318/593 |
| 4,629,956 | 12/1986 | Nozawa et al. | 318/625 |

Primary Examiner—Benjamin Dobeck
Attorney, Agent, or Firm—Wood, Herron & Evans

[57] ABSTRACT

An apparatus and method is disclosed for controlling motion of a tape dispensing apparatus or the like in response to both computer change in position signals and proportional and integral tracking error signals to maintain a desired conformal relationship between the tape dispensing apparatus and a contoured surface. The level of responsiveness to computer change in position signals versus tracking error signals is adjustable depending upon the severity of the contour so as to optimize servo tracking where necessary.

23 Claims, 13 Drawing Figures $K_{P2} = 0$
$K_{PT} = MAX (\neq 0)$
$K_{IT} = MAX (\neq 0)$ $K_{P2} = MAX (\neq 0)$
$K_{IT} = K_{PT} = 0$ $K_{P2} < MAX (\neq 0)$
$K_{IT} < MAX (\neq 0)$
$K_{PT} < MAX (\neq 0)$

METHOD AND APPARATUS FOR TAPE DISPENSING SERVO TRACKING CONTROL

BACKGROUND OF THE INVENTION

I. Field of the Invention

This invention relates to servo tracking control by which a tape dispensing apparatus may be maintained in desired spatial or conformal relationship with a contoured surface to which the tape is to be applied. More particularly, the present invention relates to such servo tracking control in which positioning of the dispensing apparatus may be balanced between response to computer position commands and response to servo tracking control signals depending upon the severity of the contour of the surface.

II. Description of the Prior Art

By way of background, a computerized tape-laying machine may include a tape dispensing apparatus which is positionable and movable under computer control relative to a layup tool or the like to which a composite tape material is to be applied to form parts such as aircraft wings, for example. Such a machine includes a horizontal gantry mounted for linear movement above the ground on a machine frame including left and right sidewalls fixedly supported on respective left and right pylons. Mounted for linear movement perpendicularly relative to the gantry is a carriage which movably supports a tape applicator head. The tape applicator head is vertically and rotationally movable such that in cooperation with the gantry and carriage, a tape dispensing shoe of the tape applicator head is movable in a plurality of rectilinear and/or rotational axes under control of a computer program by which to apply several plies of composite material or tape to the layup tool placed between the pylons.

For example, the tape applicator head is movable vertically upwardly and downwardly relative thereto by a Z-axis servo control under program control. Also, the tape applicator head is movable horizontally relative the layup in an X-axis (by movement of the gantry) and in a Y-axis (by movement of the carriage) all under program control. The tape applicator head is further movable under program control along an arc over the layup, for example, along an A-axis. Movement of each member (gantry, carriage, tape applicator head, etc.) is effected by one or more motors under control of respective servo controls. As is well known, commands from a computer control or the like to a servo control will cause the servo control to generate appropriate voltage signals to effectuate rotation of the related motor by which the member is propelled. That is, in response to appropriate commands from the computer, the selected members will thus be driven along the desired linear or rotational axis a desired distance or angle in a desired direction.

Ordinarily, movement of the tape applicator head will result in a corresponding movement of the tape dispensing shoe coupled thereto. Thus, by moving the members as desired, the tape dispensing shoe will follow a desired path and cause various patterns of composite layers to be placed upon the layup tool in a pattern defined by the path which the tape dispensing shoe follows.

In a typical program mode, movement of the various members is effected by motors coupled to servo controls which are under direct control of he computer program. The computer calculates the distance S the head is to be moved and, based upon predetermined feed rates, determines how far each member should move in its respective axis over a predetermined time or interpolation interval. The computer will utilize that information to repeatedly generate change in position commands by which to simultaneously instruct the servo controls to cause the motors to move the various members respective distances in their respective axes during that particular interpolation or iteration interval. Thus, for example, instructing the head to move in one direction 0.01 inch every 10 ms ideally results in effecting movement of the head along the selected axis at a velocity of 1.0 inch/sec. To accomplish same, the servo control generates a voltage signal corresponding to the desired velocity of the appropriate member, which velocity is correlated to the change in position commands from the computer.

Also, as is conventional, a resolver coupled to each drive motor generates a resolver signal which is utilized to indicate to the associated servo control the position of the associated member. Coupled between each motor and related servo control is a drive amplifier to supply motor drive currents in response to the velocity signal from the associated servo control. The motor may also provide a tachometer signal for use by the drive amplifier in a velocity feedback loop as is conventional. The servo controls will each generate a velocity command signal based upon a following error signal which is derived from the actual position of the member (as indicated by the resolver signal) and the desired position thereof (as calculated using the change in position command signal from the computer). Typically, the following error signal is the difference between the actual and desired position signals. The servo control multiplies the following error signal by a gain factor signal to generate the velocity command signal. The velocity command signals are then converted in the servo control to voltage signals and coupled through an associated drive amplifier to the motor to cause movement of the member at a velocity correlated to the following error and gain factor signals. The gain factor signal is selected so that the voltage signal corresponding to the velocity command signal will result in movement of the member at a predetermined velocity correlated to a predetermined following error signal, e.g., 1 inch/min for one-thousandth inch following error signal (1 inch/min per 1/1000 FE). The gain factor signal facilitates correction of known relationships in the gear mechanisms, for example. By controlling motion of each member in the foregoing manner, the tape dispensing shoe can be caused to follow previously defined paths including various contours.

It is desirable that the tape dispensing shoe precisely follow the pattern of axial coordinates as directed by the computer so that the tape will be applied to the layup tool in the desired manner and with the desired conformal relationship between the shoe, tape and layup tool.

Loss of the desired conformal relationship could result in misapplied tape material. As an example, slight misalignment between the layup tool and the shoe could result in the shoe and the tape being vertically displaced slightly above the layup tool rather than in contact therewith resulting in poor application of tape. Alternatively, the shoe could be driven against the layup tool with too much force thus possibly damaging the tape as it is applied.

To overcome problems which might, for example, result from such slight misalignment, the tape dispensing shoe may be permitted to "float" over a limited vertical distance in the Z axis relative a Z axis reference point to which the computer has instructed the tape applicator head (and thus the shoe). The tape dispensing shoe may similarly be permitted to float over a limited arcuate distance in the axis relative an A axis reference point to which the computer has instructed the tape applicator head (and thus the shoe) to move. If there is only slight misalignment, permissible float may be sufficient to overcome problems due thereto. Preferably, however, as the shoe moves over any part of its available float distance (due, for example, to interaction of the layup tool and the tape dispensing shoe) the head is to be repositioned from the positions commanded by the computer to compensate for the extent of movement over the float distance to thereby maintain the desired spatial or conformal relationship between the shoe and the layup tool. In the past, such compensation has been done externally of the computer by a further error signal coupled to the servo driver.

To generate the further error signal, the distance of float over which the head has moved, i.e., difference between the position or reference point to which the shoe was commanded by the computer (e.g., the desired X or A coordinate) and the actual position of the shoe is measured. An electrical signal correlated to the movement over the float distance is then generated. The further error signal is proportional to the aforesaid electrical signal and is applied to the servo motor to further position the head beyond or before the reference position. While this technique of float compensation results in useful servo tracking control between the shoe and the layup tool, the ability to maintain tracking has not been satisfactory for many situations.

Additionally, in some situations movement of the tape applicator head in the X- and/or Y-axes has been under program control while the tape applicator head has been permitted to move in the vertical or Z axis, for example, exclusively in response to vertical changes in the layup tool. In such applications, servo tracking control is not only useful but necessary.

In this type of application, the head is positioned so that it contacts the layup tool. Thereafter, as the tape head moves horizontally across the layup, any vertical inclination or contours, for example, would cause some movement over the Z-axis float distance. That is, because the tape dispensing shoe is permitted to float somewhat, it will generally tend to follow the contour. As with programmed control subject to misalignment, it is desirable to vertically reposition the entire tape applicator head as the dispensing shoe moves horizontally so as to maintain the same spatial or conformal relationship between the head and the layup throughout the traverse of the layup. Moreover, large variations in contour require that the entire tape applicator head move, otherwise the limited distance of float will be exceeded.

Movement of the dispensing shoe in response to a contour variation will result in displacement between the shoe and an initial Z axis reference point as determined when the shoe first contacts the layup (i.e., movement over the Z axis float distance). The further error signal generated in response to the displacement has been applied, as discussed above, to the Z axis servo motor to cause a corresponding adjustment in the shoe position relative the initial Z axis reference point. As the Z axis servo motor repositions the head (to restore the shoe to its nominal position), the Z axis reference point is then also shifted. The corresponding change in vertical spacing between the reference point and the shoe will offset the earlier displacement. If the shoe continues to change position due to the layup tool contour, the reference point will continue to adjust in an effort to maintain the shoe in a desired spatial or conformal relationship with the layup tool. Absent such tracking servo control, the shoe could lose contact with the layup tool or jam into the layup tool surface, neither of which is desirable.

As mentioned, the tape dispensing shoe may also move in an arcuate A axis so as to account for angulation contours in the layup. Movement of the tape head in the A axis has similarly been either under program control with servo tracking as before described or with servo tracking alone.

It will be appreciated that as the severity of the contour increases from less severe or gentle to more severe (e.g., from flat to undulating to having discontinuities) it becomes more difficult to maintain the desired spatial or conformal relationship. For example, at a discontinuity, such as where the slope of the layup changes from upward to downward, if the tape head is not pre-programmed to be adjusted vertically at that location, the head will tend to continue in its upward movement whereby the shoe might disengage the layup for a time resulting in misapplied tape, e.g., inconsistent compaction, because the desired conformal relationship is no longer present. Conversely, if the slope changes from downward to upward, without program control, the tape dispensing shoe could ram the layup tool. With the servo tracking of the prior art, such problems were not adequately avoided. Additionally, the types of contours encountered may change from time to time. For example, slight misalignment problems, as mentioned, may be accounted for by servo tracking alone whereas severe contours may require program control as well. With the servo tracking of the prior art, such variations in work surfaces from job to job were not easily accounted for.

SUMMARY OF THE INVENTION

The present invention provides a method and apparatus for servo tracking control such that reference positioning of a tape dispensing shoe or the like along at least one axis as it moves across a surface is under control of the computer controller by which a desired spatial or conformal relationship between the tape dispensing shoe and the layup tool surface may be maintained. In its broadest sense, the invention provides such a method and apparatus by including as components of the velocity command signals from the computer a control signal which is both (1) correlated to the change in position commands as determined by a programmable gain factor and (2) correlated to displacement in axial spacing between an axis reference point and the tape dispensing shoe or tape application point due to movements over the float distance as determined by a second programmable gain factor. The two gain factors are interrelated and are varied depending upon the severity of the contour such that the first gain factor should dominate for more sharply contoured, i.e., more severe, surfaces and the second gain factor should dominate for smooth, less sharply contoured, i.e., less severe, surfaces. Thus, for more severe surfaces, responsiveness to change in position command signals prevails over tracking error signals whereas for less severe surfaces, the opposite is provided. That is, incorporating servo tracking into the velocity command signal generation sequence of the computer permits appropriate adjustment of gain factors to obtain an appropriate balance between response to the change in position commands and the servo tracking further error signal depending, for example, on the degree of abruptness in change of contour of the surface involved. Thus, as the head traverses an undulating surface, displacement will be properly compensated so as to prevent exceeding the float limits and to assist in positioning the application point relative to the surface of the layup tool more rapidly after discontinuities or gaps are encountered on the layup tool. Additionally, the second gain factor includes a programmable proportionality factor and a programmable integral factor whereby to provide servo tracking control with a signal which is both proportionally and intergrally correlated to float movement in combination with a portion of the computer change in position command signal. This is believed to provide better servo tracking than previously attained. In particular, dynamic and steady state tracking is enhanced whereby to obtain the desired spatial or conformal relationship.

These and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate a preferred embodiment of the invention and, together with a general description of the invention given above, and the detailed description of the preferred embodiment given below, serve to explain the principles of the invention.

DESCRIPTION OF THE PREFERRED EMBODIMENT

To illustrate the present invention, a program controlled tape-laying machine and control incorporating servo tracking control shall be described in detail. The machine 10 to be described herein is preferably a "CTL Multi-Axis CNC Fiber Placement Machine" and is available from Cincinnati Molacron Inc., the assignee of the present invention and described in a brochure of the same title, Publication No. SP-152-2, Copyright 1986. Publication No. SP-152-2 is incorporated herein by reference. Control 120 to be described herein is preferably an ACRAMATIC 975 CNC also available from Cincinnati Milacron as described in "Feature Descriptions for the Cincinnati Milacron Acramatic 975C", Publication No. CTL-452, revised Jan. 28, 1986. Publication No. CTL-452 is incorporated herein by reference.

Figure 1:
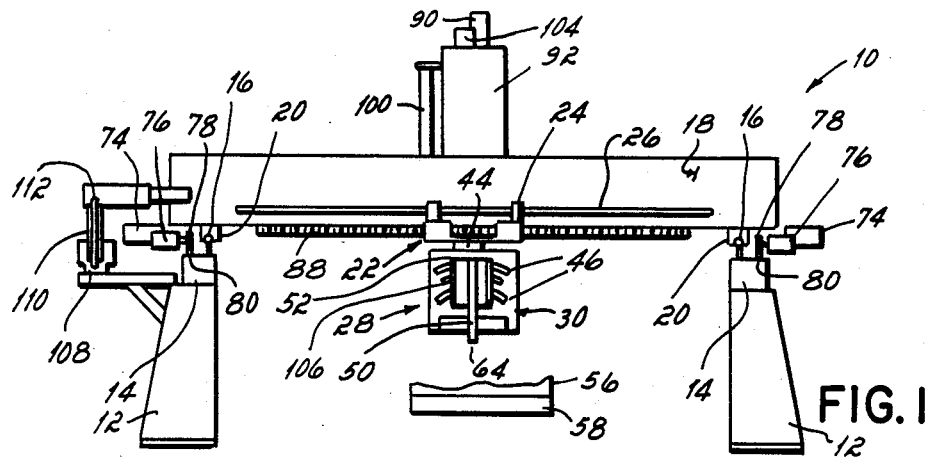
FIG. 1 is an end view of a tape-laying machine to which the present invention is applicable.
Figure 2:
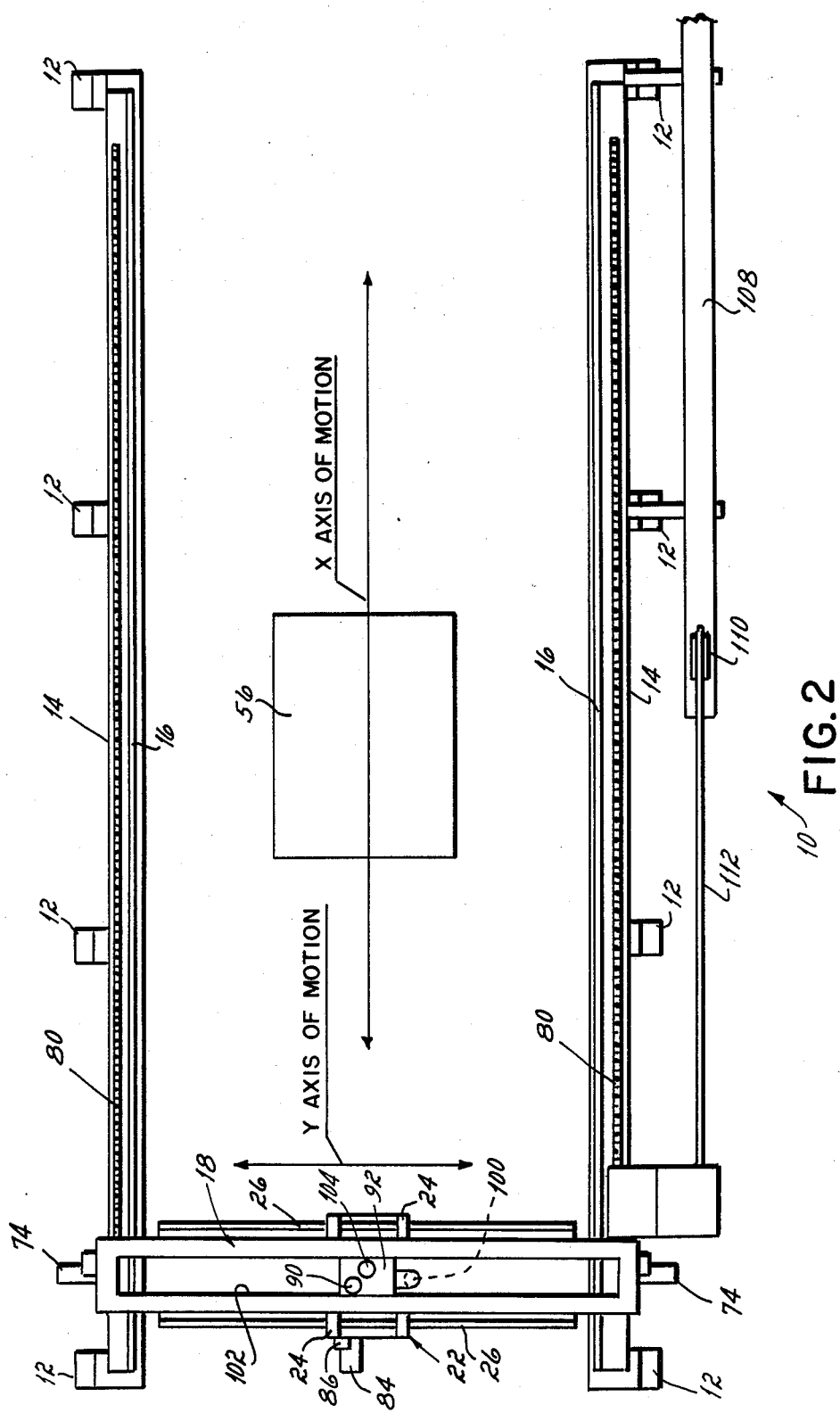
FIG. 2 is a top view of the machine of FIG. 1.

The machine shall be described with reference to FIGS. 1 and 2. Tape laying machine 10 includes a plurality of vertical support stands or pylons 12 which fixedly support a pair of horizontal side members 14 to define a machine frame. Fixedly secured to each side member 14 is a cylindrical way 16. A slotted, horizontal gantry or member 18 is supported on side members 14 by slides 20 slidably supported on cylindrical ways 16. Gantry 18 comprises a large rectangular cross-section member to which slides 20 are rigidly affixed. Horizontal motion of gantry 18 relative to vertical support stands 12 defines the X axis of motion of machine 10.

A carriage 22 is movably supported upon gantry 18. To this end, carriage 22 includes slides 24 which are slidably supported upon cylindrical ways 26. Ways 26 are fixedly attached to gantry 18. Horizontal motion of carriage 22 relative to gantry frame 18 along ways 26 is defined as the Y axis of motion.

Figure 3:
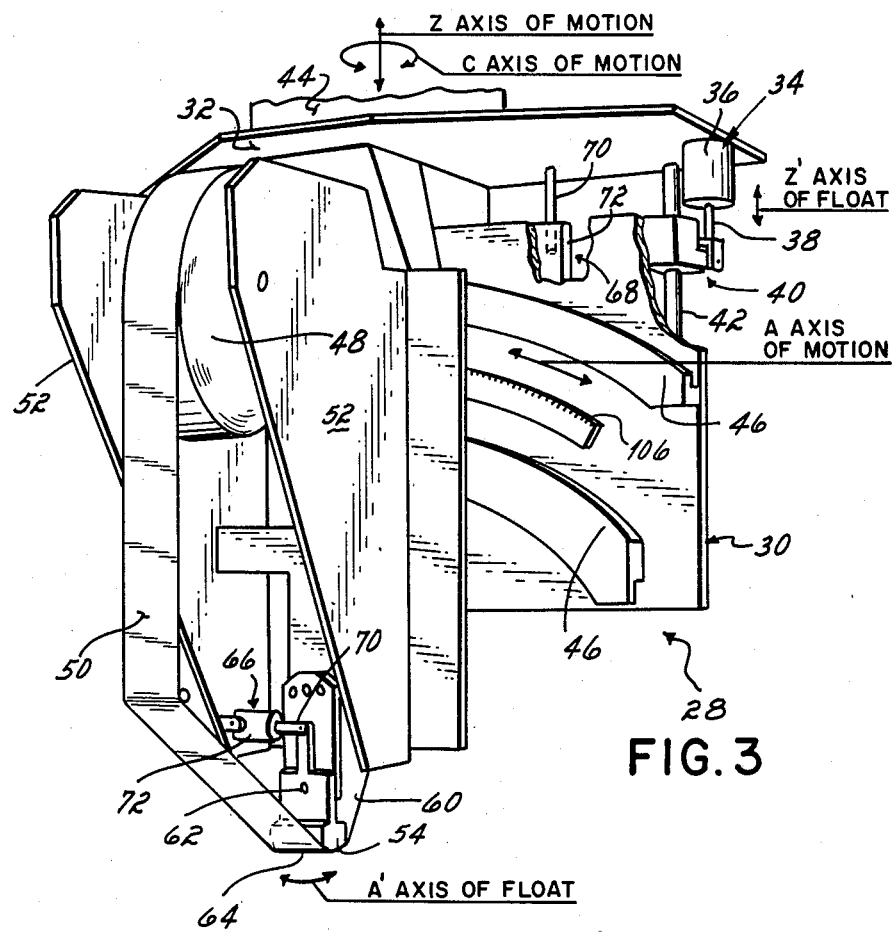
FIG. 3 is a perspective, schematic diagram of the tape applicator head of the machine shown in FIG. 1 together with some of the axes of motion of the head and shoe for purposes of explaining the principles of the present invention.

Carriage 22 provides support for a tape applicator head 28 or the like (FIG. 3). Head 28 is supported on a rigid vertical guide or backing plate 30 which is movably supported to carriage 22 for movement of tape head 28 in a plurality of axes. Specifically, plate 30 is pneumatically suspended from upper, horizontal plate 32 by left and right fluid actuators 34 (only the right one shown in FIG. 3) by which to counterbalance the weight of head 28 and plate 30 and to permit float movement in the little Z or Z' axis as will be discussed. Cylinder 36 of each fluid actuator 34 is secured to upper plate 32 whereas actuator rod 38 thereof is journaled to a ball bushing assembly 40 (only one shown) secured to plate 30. Each ball bushing assembly 40 is slidable on a vertical guide rod 42 (only one shown) affixed to plate 32. Upper plate 32 is in turn rotatably coupled to column 44 which is carried by carriage 22. Vertical movement of head 28 is accomplished by movement of column 44 upwardly or downwardly and is defined as the Z axis of motion of machine 10; rotational movement of head 28 is accomplished by rotation of upper plate 32 relative column 44 and is defined as the C axis of motion; and angular or arcuate movement of head 28 is accomplished by moving head 28 along arcuate ways 46 secured to backing plate 30 and is defined as the A axis of motion (FIG. 3).

Head 28 carries a spool 48 of composite tape material 50. Spool 48 is rotatably held by frame 52 of head 28. Tape material 50 passes over a presser member or tape dispensing shoe 54 (shown diagrammatically in FIG. 3) to be applied to a layup tool 56 on mold 58 (FIGS. 1 and 2). Tape material 50 on spool 48 includes a backing web 60 which is taken up by another spool (not shown) as composite tape material 50 is applied to the surface of layup tool 56. Shoe 54 is pivotally coupled to frame 52 as at 62 to float in an axis related to the A axis. This axis of float is referred to as the little A or A' axis. Similarly, as previously mentioned, head 28 and plate 30 float relative upper plate 32 due to fluid actuators 34 in an axis related to the Z axis. This axis of float is referred to as the little Z or Z' axis.

Specification of coordinates of the X, Y, Z, C, and A axes defines a location of presser member or tape dispensing shoe 54 associated with tape head 28. The position of shoe 54 as defined by the above coordinates, defines a reference tape dispensing or application point 64 wherein the tape is to contact the surface of layup tool 56. Ordinarily, member 54 is aligned with frame 52 in the A axis but is permitted to float in the A' axis. Also, member 54 is at a predetermined location in the Z axis. Fluid actuators 34 act as counterbalances to thereby maintain the position of shoe 54 in the Z axis relative upper plate 32. Shoe 54 is, however, movable over the stroke of fluid actuators 34 in the Z' float axis. Tape head 28 preferably further provides tape cutters (not shown) and may be controlled with respect to other axes (not shown) such as tape reel position or cutter angle and linear traverse of the tape cutters (not shown). Tape head 28 may be that shown in U.S. Pat. No. 4,627,886, entitled "Composite Tape Laying Machine with Pivoting Presser Member", the disclosure of which is incorporated herein by reference.

With respect to float movement in the A' and/or Z' axes, machine 10 is provided with a pair of transducers 66, 68, respectively, by which to monitor same. Transducers 66, 68 are preferably type 1000 HR LVDT's (linear voltage differential transformers) available from Schievitz Engineering, Pennsaucken, N.J. LVDT's 66, 68 include a slug or rod 70 movable into and out of coil 72. As is well known, as slug 70 moves relative coil 72, the magnitude of an electrical signal from coil 70 will indicate the relative displacement of slug 70. Slug 70 of LVDT 66 is coupled to member 54 while coil 72 thereof is coupled to frame 52 whereby movement in the A' axis results in a displacement signal from LVDT 66. Similarly, slug 70 of LVDT 68 is coupled to upper plate 32 and coil 72 thereof is coupled to plate 30 whereby movement in the Z' axis results in a displacement signal from LVDT 68. The displacement signals will be utilized to generate tracking error signals as will be described.

Movement of the various members in their respective axis will now be explained. Gantry 18 is propelled bidirectionally in the X axis by a pair of drive motors 74 fixedly mounted to the distal supported ends of gantry 18. Coupled to each motor 74 is a transmission 76 which includes the necessary gearing (not shown) and an extending driver gear or pinion 78. Extending pinions 78 mesh with racks 80 which are fixedly mounted to and adjacent side members 14. As is well understood, velocity command signals will be utilized to drive motors 74 thereby causing pinions 78 to rotate and, in cooperation with racks 80, each end of gantry 18 to move.

To provide positional information of gantry 18, motors 74 incorporate position transducers or resolvers (not shown) whereby movement of gantry 18 is translated to feedback signals for utilization in control of motors 74. Each of motors 74 may be independently controlled by respective servo controls which are preferably responsive to a single X axis change in position command signal (although separate such command signals could be employed).

With respect to the Y axis, motion of carriage 22 relative to gantry 18 is effected by drive motor 84 which, through transmission 86, imparts rotation to a pinion (not shown) which rotatably meshes with rack 88 rigidly affixed to gantry 18 to cause movement of carriage 22. The position of carriage 22 in the Y axis is measured by a position transducer or resolver (not shown) coupled to motor 84.

Figure 5:
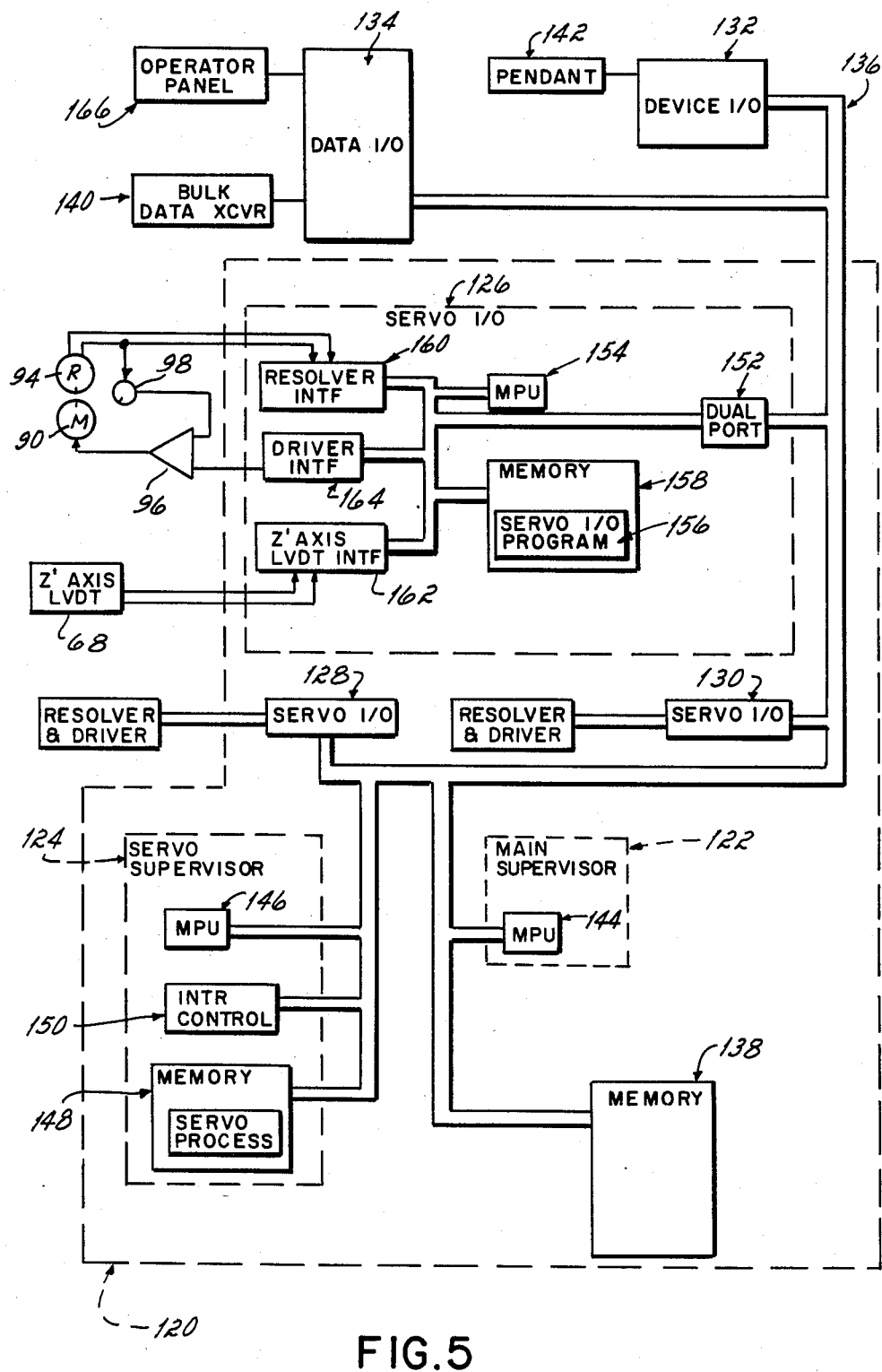
FIG. 5 is a block diagram of the control for the machine shown in FIGS. 1 and 2.

Motion of tape head 28 in the Z axis is accomplished by a nut (not shown) through which is threadably received a threaded rod (not shown). The nut is held to column 44 so that vertical motion of the nut translates to vertical motion of column 44 whereby plate 30 coupled thereto also moves vertically. The threaded rod is threadably received in the nut and is caused to rotate by drive motor 90 via a related transmission (not shown), both of which are affixed to the top of upper housing 92 which is itself coupled to carriage 22 for movement therewith. As the threaded rod rotates, the nut will ride up and down thereon causing head 28 (supported on plate 30) to move upwardly and downwardly in the Z axis. Coupled to motor 90 is also a position transducer or resolver 94 shown schematically in FIG. 5 by which the position of head 28 in the Z axis may be monitored. Motor 90 also further preferably includes a velocity feedback loop comprising drive amplifier 96 and tachometer 98 (represented schematically in FIG. 5).

As is conventional, the output of tachometer 98 is fed back to drive amplifier 96 for a velocity feedback loop. Drive amplifier 96 further preferably includes a gain adjustment (not shown) to manually set the gain thereof so that a predetermined voltage signal from related servo control 126 will cause movement of head 28 in the Z axis at a predetermined velocity as will be explained. Drive amplifier 96 further preferably includes a balance adjust (not shown) by which to manually set the bias therein so that a signal of zero volts from the related servo control will result in a velocity of zero of head 28 in the Z axis. In addition to drive motor 90, pneumatic counter balance 100 is provided to equalize the load presented to drive motor 90 between the up and down directions. Preferably the threaded rod and nut (both not shown) comprise a ball screw arrangement.

Rotation of head 28 in the C direction is effected by rotation of plate 32 by a drive (not shown) which extends through lengthwise slot 102 in gantry 18 and within column 44. Such rotation is imparted by drive motor 104. Sensing of motion (or angle) is similarly accomplished with a resolver (not shown) coupled to motor 104. Finally, angulation of head 28 in the A direction is effected by a drive motor (not shown) affixed to frame 52. A pinion (not shown) coupled to the A axis motor (not shown) meshes with arcuate rack 106 affixed to plate 30 to cause movement of frame 52 in the A axis. Arcuate ways 46 cooperate with slides (not shown) secured to frame 52 to maintain angulation in a desired path. Positional (angular) information in the A axis may also be monitored by a resolver (not shown) coupled to the A axis drive motor.

Preferably, each drive motor includes a conventional velocity feedback loop as described in connection with Z axis servo motor 90. Machine 10 further preferably includes a tray 108 attached to selected ones of support stands 12 and in which wheeled wire guide 110 rides. Wire guide 110 provides a convenient mechanism to avoid tangling the wires 112 coupled between the various motors and resolvers and the like of machine 10 and computer or control 120 which will now be illustrated with reference to the block diagram of FIG. 5.

Control 120 directs motion of the members of machine 10. Control 120 is a digital microprocessor-based computer system. Hence, in the preferred embodiment, the change in position signals, following error signals, further or tracking error signals and gain factor signals, for example, are implemented as digital words. Control 120 includes a plurality of independent modules including main supervisor (or block processor) 122, servo supervisor 124, servo modules 126, 128, and 130 (servo I/O's) each of which may be coupled to one or more drivers and resolvers, device input/output module 132, and data input/output module 134 all connected by a common bus 136. Each of these modules typically includes a microprocessor and associated peripheral devices and memory as required for the function of the module. Applicants have chosen to implement these modules using the 80186 microprocessor and peripheral devices available from Intel Corporation. Control 120 also includes a main memory 138 in which is stored the application program(s) defining desired movement of the members to construct a component such as an aircraft wing, for example, on layup tool 56 positioned between pylons 12.

The overall cycle of operation of machine 10 is defined by an application program stored in memory 138 and executed by main supervisor 122. The application program stored within memory 138 may be produced on independent equipment and loaded through the data input/output module 134 from a bulk data transceiver 140. A pendant 142 is coupled to bus 136 by device I/O 132 by which to manually control movement of the members of machine 10.

During execution of the application program, microprocessor unit 144 of main supervisor 122 executes the selected programs stored in memory 138 until the end of the program has been reached, i.e., all the moves of tape head 28 have been completed. To effect movement of the machine members for each move of tape head 28, main supervisor 122 generates span and control signals (see FIG. 6A) which are utilized by servo supervisor 124 to repetitively generate change in position command signals by which to control operation of the servo control modules 126, 128, and 130 as will be explained. Servo supervisor 124 includes a local microprocessor 146 executing servo processing programs (see FIG. 6B) stored within local memory 148 and an interrupt control 150 responsive to interrupts from a master servo I/O (one of the servo I/O's, e.g., servo I/O 126 is selected as the master servo I/O). In response to an interrupt from servo I/O 126, preferably every 5 milliseconds, change in position command signals are determined by servo supervisor 124 and distributed to the appropriate servo mechanism input/output interface. Each of the servo mechanism input/output interface modules provides the necessary interface circuitry for connection to at least one drive motor and its associated resolver.

Figures 4A, 4B:
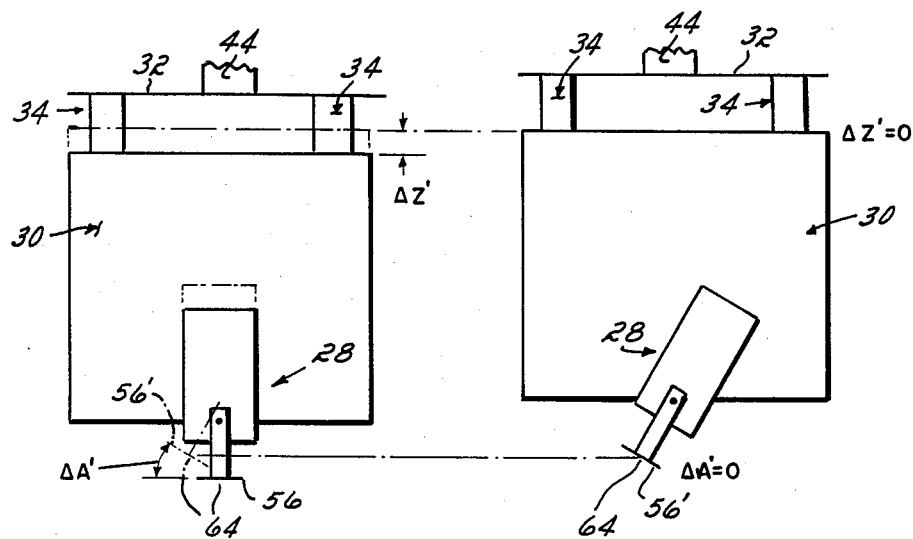
FIGS. 4A and 4B are simplified, diagrammatic illustrations of the head of FIG. 3 showing the consequences of float movement and servo tracking control for purposes of explaining the principles of the present invention.

Further details of the servo mechanism interface modules are illustrated by the servo control module 126 which controls four (4) axes including, for explanation purposes, the Z and Z' axes and is, hence, shown coupled to a driver and resolver for the Z axis and an LVDT interface for the Z' axis. While not shown, module 126 also preferably controls motion of head 28 in other axes. Each of servo I/O's 126 and 130 may similarly be coupled to a plurality of drivers and resolvers (only one shown for each in FIG. 4) to thus control motion of head 28 in several other axes, including the A, A', X, Y and C axes.

Connection between module 126 and common bus 136 is achieved through dual port memory device 152. Data to be exchanged between module 126 and other modules within the system is transferred asynchronously through dual port memory device 152. Local processor 154 executes servo input/output programs 156 (see FIG. 7) stored within local memory 158.

Local processor 154 receives position feedback signals from Z axis position transducer 94 and the Z' axis LVDT 68 through resolver interface circuitry 160 and LVDT interface 162, respectively. Position feedback signals from Z axis position transducer 94, for example, are compared to desired position command signals (CMD POS) calculated using change in position command signals received from servo supervisor 124 to generate a following error signal (FE). Processor 154 modifies the following error signal by a gain factor signal stored in memory 158 to produce velocity command signals (VCMD) which are converted to voltage signals in driver interface 164. In the tracking mode, a tracking error velocity command signal is included with VCMD to generate a balanced velocity command VDRIVE as will be explained. Interface 164 includes a digital-to-analog converter (not shown) which converts the digital velocity command signals to voltage signals which are input to amplifier 96 to drive motor 90. Thus, the velocity command signals (VCMD in the non-tracking mode and VDRIVE in the tracking mode) define the velocity of drive motor 90 and are produced from a comparison of the positional information provided by Z axis position transducer 94 and the change in position signals (#CMD) as modified by a gain factor signal associated with the Z axis servo mechanism and, in tracking, a tracking error signal.

For non-tracking mode, memory 158 is preferably preprogrammed with four gain factor signals ($K_{gain}$). That is, the initial or pre-programmed gain factor signals for each motor under its control are separately selected for both forward and reverse directions of movement of head 28 in the four related axes of movement to accommodate differences in transmissions, pinions, and racks, for example, so that each member moves at a respective predetermined velocity in response to a known change in position command to the associated servo control. The gain factors for the other axes are similarly preselected or initialized to account for gearing relationships and the like so that the velocity of movement in those axes may be known. In cooperation with the manual gain adjustment for each associated drive amplifier, the initial gain factor signals are preferably selected as 1.0000, so that the velocity of each member is 1 inch/min per 1/1000 inch FE in each of the forward and reverse directions. Once set, the manual adjustment is typically not altered. The gain factor signal procedure disclosed in pending U.S. patent application Ser. No. 020,820, entitled "Method and Apparatus for Automatic Servo Gain Adjustment for Machine Control", filed Mar. 2, 1987, and assigned to the assignee herein, the disclosure of which is incorporated herein by reference, may be employed to compensate for drift in the drive amplifiers and to correct for errors in the preselected gain factor signal. During tracking, respective gain factors $K_{P2}$, different from the preselected gain factors ($K_{gain}$) for the Z axis and the A axis are utilized as will be discussed.

Figure 6A:
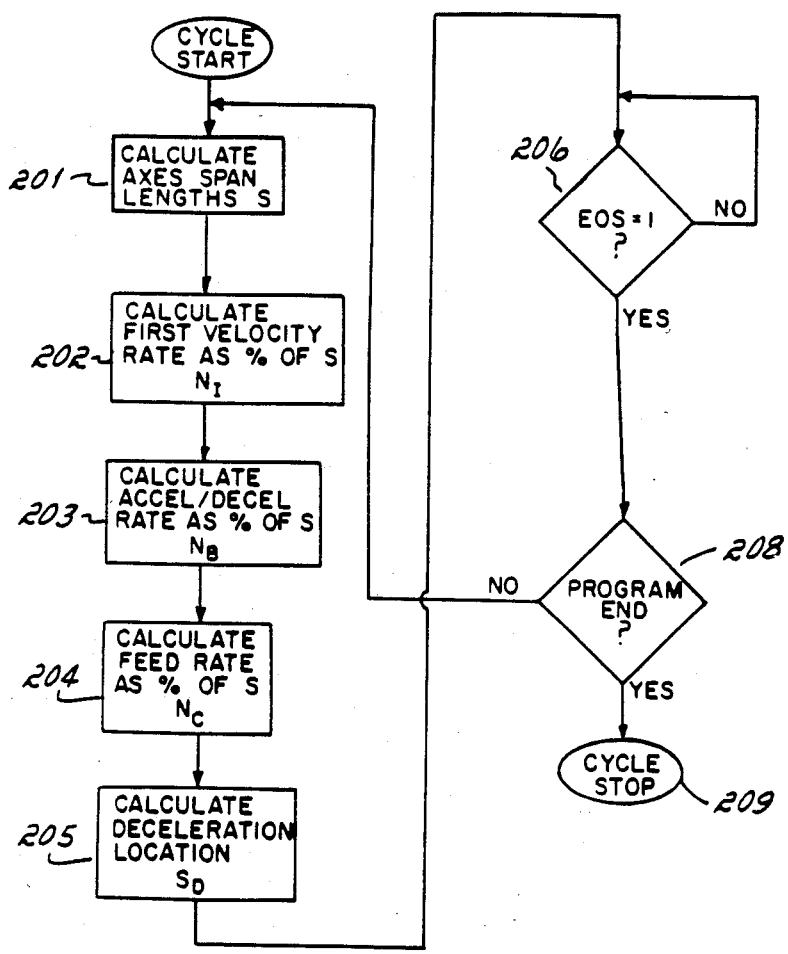
FIGS. 6A and 6B are simplified flow charts of the control procedures effected by the control of FIG. 5.
Figure 6B:
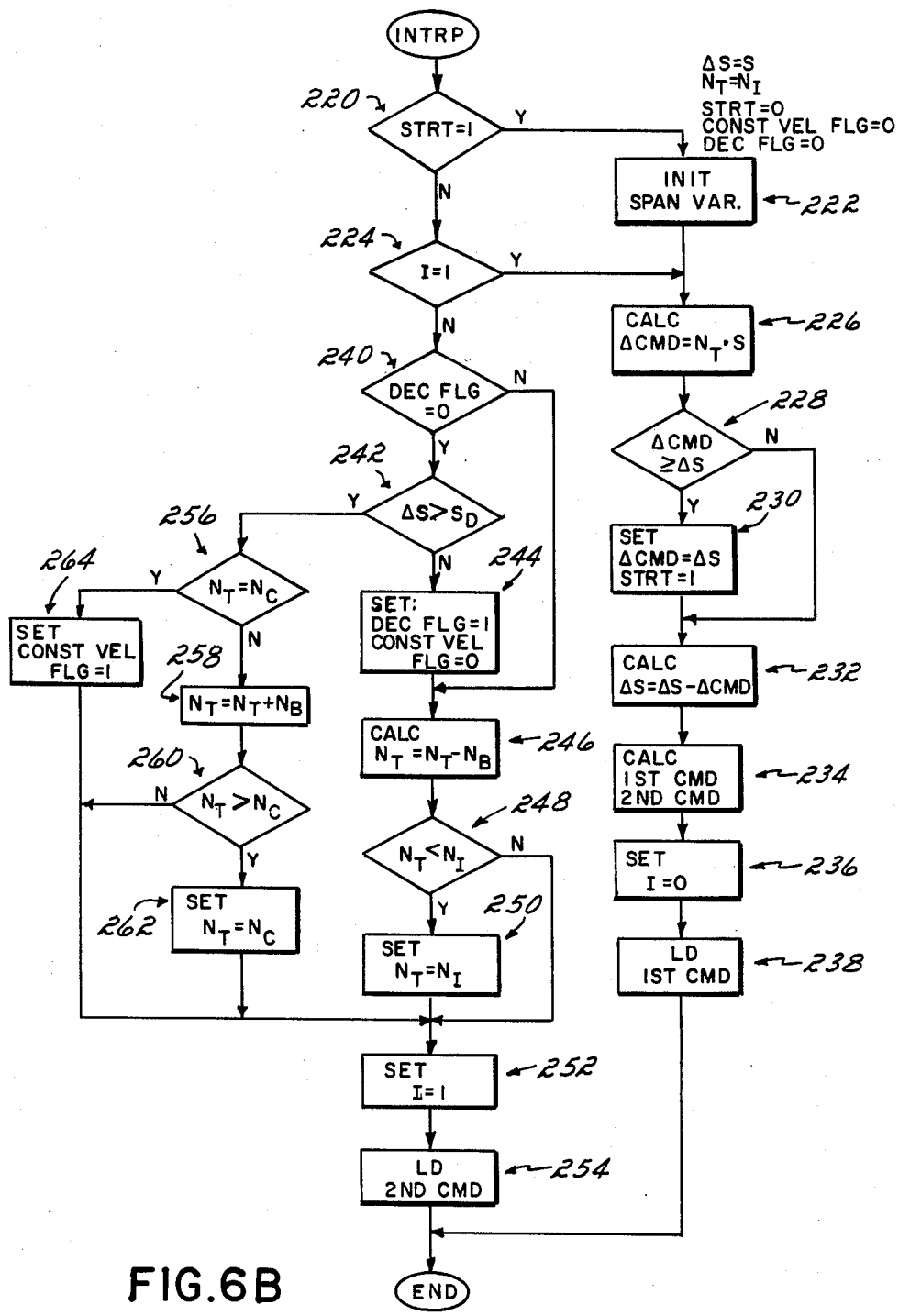

The control procedures for effecting motion of the members during operation of the application program stored in memory 138 shall be described with reference to the flow charts. The flow chart of FIG. 6A illustrates the processing steps executed by the main supervisor 122 to produce span and control signals in accordance with the application program defining locations and functions stored in memory 138. The flow chart of FIG. 6B illustrates the processing steps executed by servo supervisor 124 to generate change in position command signals from the span and control signals produced by main supervisor 122.

Processing of the procedural steps of the flow chart of FIG. 6A is initiated by a cycle start signal produced in response to the operation of a cycle start push button (not shown) an operator panel 166. At process step 201 data are computed which are required for the interpolation of intermediate points along a linear path, for example, between two successive programmed locations of shoe 54 (i.e., tape application or dispensing point 64). The span length S in each axis is determined from the coordinate data of these locations. A pre-programmed velocity or feed rate is recalled from memory 138 and, in conjunction with the span length signal S for each axis, additional velocity control signals are calculated at process steps 202–205 as follows:

$N_I$ = the percent of S which the member is to move in the selected axis during the first and last interpolation intervals defining a step velocity change;

$N_B$ = the percent of S by which the interpolation incremental distance is to change;

$N_C$ = the percent of S which the member is to move during each interpolation interval in the constant velocity mode; and $S_D$ = the distance from the end of the span at which deceleration must begin from the programmed velocity.

These values for S, $N_I$, $N_B$, $N_C$ and $S_D$ are stored in a buffer in memory 138 for access by the servo supervisor 124 during the servo supervisor's execution of the span.

After process steps 201–205 have been executed, the overall cycle of operation executed by the main supervisor is controlled by the completion of motion as indicated by the end of span signal detected at decision step 206. If the servo supervisor has not set the end of span flag, herein referred to as EOS, the sequence may idle at process step 206 until the end of the span is reached (EOS=1). Preferably, the sequence of steps 201 to 205 will be executed for the next span before the end of the previous span is reached in an effort to pre-process information to generate the next set of span and control signals which may then be loaded into a buffer.

Following completion of interpolation, a decision is made at process step 208 to determine whether or not the location defining the end of the current span corresponds to the end of the program stored in memory 138. If not, execution of the control procedure of FIG. 6A continues to process step 201 to initialize data for the next programmed span. Execution of the stored program of motion continues in this fashion until it is determined at decision step 208 that the last location of the program has been reached. Thereafter, the tape laying program execution ceases, but the entire program may be re-executed by operator intervention.

The primary axis command signal processing of servo supervisor 124 shall be described with reference to FIG. 6B. Periodically, in response to an interrupt signal generated by master servo I/O 126, a span increment procedure is executed to output servo commands to the servo I/O modules 126, 128, 130.

At decision step 220 it is determined whether the current execution of the span increment interpolation procedure is the first execution for the current span. If it is, span variables are initialized at process step 222 in preparation for interpolation of the first increment of the current span. The span length remaining $\Delta S$ is initialized to the axis span length S; the current value of the increment factor $N_T$ is initialized to the step velocity factor $N_I$; the first execution flag STRT is initialized to 0; the constant velocity flag is initialized to 0 and the deceleration flag is initialized to 0. If the current execution of the span increment interpolation procedure is not the first for the span, process step 222 is skipped. At decision step 224 it is determined whether the iteration toggle I is set to 1 indicating a first iteration for an interpolated change in commanded position $\Delta$CMD. Each change in commanded position $\Delta$CMD is processed in two iterations, and each iteration outputs half of the total change in commanded position to the appropriate servo I/O. The interpolation procedure maintains a record of progress in the current span as the magnitude of the span length remaining $\Delta S$. This magnitude is reduced once for each pair of iterations.

At process step 226, the magnitude of the change of commanded position ($\Delta$CMD) for the next pair of iterations is calculated as the product of the axis span length S and current value of the increment factor $N_T$. During the first iteration of the first execution of the procedure, the increment factor $N_T$ has a value equal to the step velocity factor $N_I$ calculated by the pre-interpolation procedure at process step 202. The magnitude of the change in commanded position $\Delta$CMD is compared to the current magnitude of the remaining span length $\Delta S$ at decision step 228. If the change in commanded position $\Delta$CMD is greater than or equal to the remaining span length $\Delta S$, the change in commanded position $\Delta$CMD is set equal to the remaining span length $\Delta S$ at process step 230. Since this condition corresponds to interpolation of the last span increment of the current span, the first flag is set true and the end of span flag EOS is set true (=1). Process step 230 is skipped if the change in commanded position $\Delta$CMD is less than the remaining span length $\Delta S$.

At process step 232, a new value for the remaining span length $\Delta S$ is calculated by subtracting the magnitude of the change in commanded position $\Delta$CMD from the previous value of the remaining span length $\Delta S$. At process step 234, the first and second iteration change in position commands 1st CMD and 2nd CMD are calculated. These commands are referred to here as #CMD (wherein # refers to 1st or 2nd as appropriate). 1st CMD is calculated by dividing $\Delta$CMD by 2, and 2nd CMD is equal to the difference of $\Delta$CMD and 1st CMD. This calculation self corrects for round off errors in the division of $\Delta$CMD. At process step 236, the iteration toggle is set to 0 in preparation for the next iteration. At process step 238, the first iteration change in position command 1st CMD is loaded into the appropriate servo I/O module.

The second iteration change in position command 2nd CMD generation begins with determination of a 0 value of I detected at decision step 224. On the occurrence of the next interrupt, after the first iteration, the value of the iteration toggle flag I will be 0 and the execution of the interpolation procedure will continue at decision step 240. There, it is determined whether the deceleration flag has been set true, indicating that interpolation has progressed to the deceleration point $S_D$ or beyond. If not, execution continues at decision step 242 where it is determined whether the remaining span length $\Delta S$ is more than the deceleration distance $S_D$ calculated in the preinterpolation procedure at process step 205. If the remaining span length ΔS is not more than the deceleration distance $S_D$, execution continues at process step 244 where the deceleration flag is set true and the constant velocity flag is set false. Thereafter, a new value for the increment factor $N_T$ is calculated at process step 246 to decrease the magnitude of the increment factor $N_T$ by the acceleration/deceleration incremental adjustment $N_B$. At decision step 248 it is determined whether the new value of the increment factor $N_T$ is less than the step velocity factor $N_I$. If it is, the interpolation factor $N_T$ is set equal to the step velocity factor $N_I$ at process step 250. Otherwise, process step 250 is skipped. Thereafter, at process step 252, the iteration toggle flag I is set equal to 1 in preparation for the next iteration. At process step 254, the second iteration change in position command 2nd CMD is loaded into the appropriate servo I/O module. It will be appreciated that the new value of the increment factor $N_T$ will result in the interpolation of a smaller increment command ΔCMD with the next execution of the increment interpolation procedure, thus effecting a decrease of the velocity of the affected machine member.

If interpolation had not progressed to the deceleration point, execution from decision step 242 would proceed to decision step 256 where it is determined whether the current value of the increment factor $N_T$ is equal to the constant velocity factor $N_C$ calculated during execution of the pre-interpolation procedure at process step 204. If the result of this test is negative, it is known that interpolation is in the acceleration phase. Execution continues at process step 258 where the magnitude of the increment factor $N_T$ is increased by the acceleration/deceleration factor $N_B$. At decision step 260, the new value of the increment factor $N_T$ is compared to the constant velocity factor $N_C$ calculated during execution of the pre-interpolation procedure at process step 204. If the increment factor $N_T$ is greater than the constant velocity factor $N_C$, it is set equal to the constant velocity factor $N_C$ at process step 262. Otherwise, process step 262 is skipped.

If at decision step 256 the interpolation factor $N_T$ is equal to the constant velocity factor $N_C$, no modification is required until interpolation progresses to the deceleration point $S_D$ and interpolation continues at constant velocity. Execution from decision step 256 proceeds to process step 264 where the constant velocity flag is set and therefrom to process step 252.

While the foregoing has been described with respect to change in position signals as if for only one axis, the sequence occurs concurrently for each axis. Hence, the various servo I/O's will receive respective interpolation change in position signals or commands (#CMD) for the appropriate axes almost simultaneously whereupon movement in all axes will be coordinated. That is, movement in each axis will accelerate to a constant velocity so that the respective constant velocity or feed rate is attained for each axis at the same time. Deceleration is to likewise occur simultaneously. Main supervisor 122 thus calculates the various values of span and control signals S, $N_I$, $N_B$, $N_C$, and $S_D$ for each axis accordingly.

Additionally, the span length S (or, alternatively, angle of rotation in the A axis, for example) may be positive or negative indicating forward or reverse motion of the member in its respective axis. As a consequence, the iteration change in position signals (#CMD) will also be either positive or negative to indicate the direction of movement.

Figure 7:
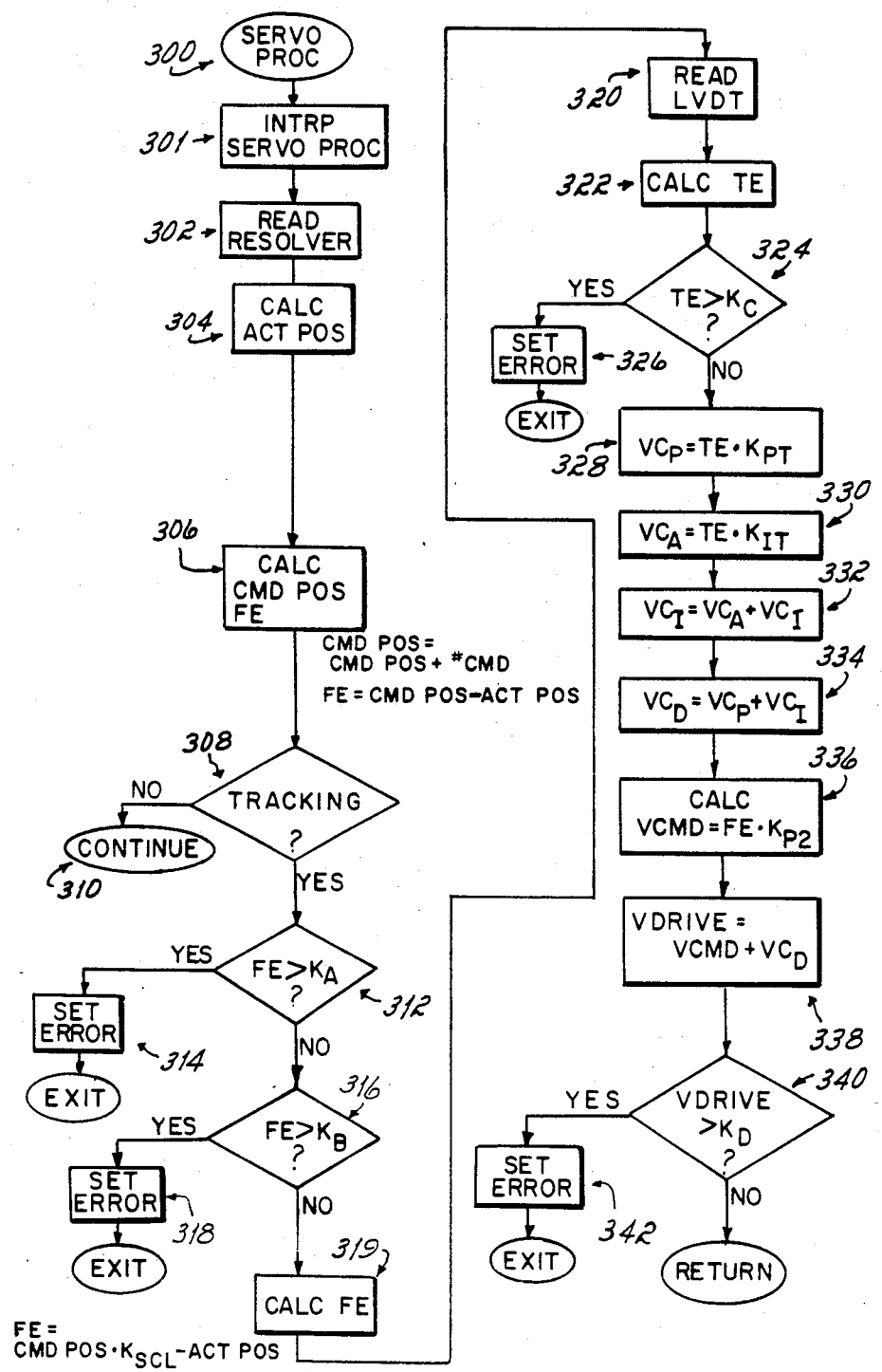
FIG. 7 is a flow chart of the procedure for tracking control of a servo motor according to the present invention.

The procedure by which a motor is driven and the servo tracking control procedure of the present invention shall be described with reference to the flow chart of FIG. 7. FIG. 7 will be explained with respect to servo I/O 126 as it relates to movement of the Z axis of head 28. It should be understood, however, that the flowchart is representative of the sequence which is concurrently utilized in connection with control of movement of head 28 in the A axis as well, whereas control of movement of head 28 in other axes may be shown, for example, in aforesaid U.S. patent application Ser. No. 020,820, filed Mar. 2, 1987.

The sequence of FIG. 7 is initiated every 5 milliseconds (step 300) and begins with issuance of an interrupt (step 301) to the servo supervisor 124. At process steps 302 and 304, resolver data from the Z axis resolver 94 is read by resolver interface 160 and microprocessor unit 154 calculates the actual vertical position (ACT POS) of the head as driven by drive motor 90. At step 306, a new command position (CMD POS) is calculated by summing the iteration change in position command (#CMD) with the previous value of command position CMD POS. Also at process step 306 a following error signal (FE) is calculated as the difference between the newly calculated command position (CMD POS) and the actual position (ACT POS).

At decision step 308, it is determined whether the servo tracking sequence of the present invention is to be implemented (as indicated by an appropriate code in the program sequence stored in memory 138). If no, the sequence braches, as indicated at 310, to a typical servo control sequence or to step 312 of the aforesaid U.S. patent application Ser. No. 020,820, filed Mar. 2, 1987, wherein control of the head 28 is under computer program control only with standard and/or modified gain signals as mentioned previously. On the other hand, if servo tracking control is to be implemented, operation branches to decision step 312 wherein it is determined whether the following error (FE) is greater than a predetermined amount $K_A$. If FE is too large, then the member has not moved sufficiently to keep up with the commands from the servo supervisor 124. As a result, an error signal representing servo failure is set at process step 314 which is made available to the main supervisor 122 and the sequence of FIG. 7 terminates. Thereafter, power to machine 10 is disconnected (not shown). On the other hand, if the following error is within limit $K_A$, it is determined whether following error is within a second limit at decision step 316. If the following error is greater than second limit $K_B$, this indicates an excessive following error which is represented by an exxcess error signal set at process step 318 and made available to main supervisor 122. And, again, the sequence of FIG. 7 is terminated. Also, the motion of the member is stopped (not shown). If the following error is also within the second limit, step 319 is conducted.

At step 319, a new following error signal (FE) is calculated as the difference between the above-calculated command position (CMD POS) as modified by a scale factor $K_{SCL}$ and the actual position (ACT POS). The purpose of $K_{SCL}$ will be discussed hereafter.

At step 320, the electrical signal (the displacement signal) from LVDT 68, associated with movement in the little Z axis is read. This electrical signal is adjusted at step 322 for any bias in the LVDT system as is well known to generate a tracking error signal (TE). At decision step 324, it is determined whether TE is greater than a predetermined amount $K_C$. If TE is too large, then head 28 has moved close to the travel limits of LVDT 68, (i.e., head 28 has moved too far in the Z' axis). As a result, an error signal is set at process step 326 and made available to main supervisor 122 and the sequence of FIG. 7 terminates. If TE is within limit $K_C$, operation steps 328, 330, 332 and 334 are conducted wherein a tracking error velocity command signal $VC_D$ is generated. Specifically, in the sequence of the present invention, servo control 126 calculates both a proportional tracking error velocity command signal $VC_P$ (at step 328), and an integral tracking error velocity command signal $VC_I$ (at step 330 and 332) which are summed together at step 334 to generate the tracking error velocity command signal $VC_D$. Proportional tracking error velocity command signal $VC_P$ is equal to TE times a preselected proportional gain factor $K_{PT}$. Similarly, integral tracking error velocity command signal $VC_I$ is equal to the sum of $VC_A$ (which is TE times a preselected integral gain factor $K_{IT}$ which is less than one and preferably much less than $K_{PT}$) plus the result of the same calculation therefor from the previous interpolation interval.

At step 336 the computer generated velocity command signal VCMD is calculated as the product of FE times preselected gain factor $K_{P2}$. At step 338, VCMD and $VC_D$ are summed to provide a balanced computer generated and servo tracking control generated velocity command VDRIVE to driver interface 164. Prior to driving motor 90 in response to VDRIVE, the value thereof is tested at decision step 340 to determine if it is greater than a predetermined amount $K_D$ representing the maximum voltage permissibly applied to drive amplifier 96 (corresponding to maximum current to motor 90). If VDRIVE is too great, an error is set at step 342 and supplied to main supervisor 122 whereupon the sequence of FIG. 7 terminates and machine 10 disabled. The foregoing allows for simultaneous program and servo tracking control of movement in the Z and Z' axis in a manner which better tracks the contour of layup tool 56 to maintain the desired spatial or conformal relationship between shoe 54, tape 50 and layup tool 56. The above sequence of FIG. 7 is also applied to control of head 28 in the A and A' axes to thereby completely control the spatial or conformal relationship of member 54 to layup tool 56 as desired as will now be explained with reference to FIGS. 4A and 4B.

In operation, head 28 is brought to a work position relative layup tool 56 such that the Z and A axes are transverse or intersect the surface of layup tool 56 and tape 50 is in contact with layup tool 56. Head 28 is then caused to traverse the surface of layup tool 56 in the X and Y axes, for example, under program control. If the contour should not remain horizontal, but instead is inclined vertically and angled, as shown in dotted line at 56' of FIG. 4A, shoe 54 will be angularly displaced a distance $\Delta A'$ in the A' axis as shown in dotted line, and head 28 (as well as plate 30) will be vertically displaced a distance $\Delta Z'$ in the Z' axis as also shown in dotted line. The values of $\Delta A'$ and $\Delta Z'$ will be utilized in the sequences of FIG. 7 as applied to control of movement in the A and Z axes, respectively, to reposition head 28 and shoe 54 to the position shown in FIG. 4B wherein reference point 64 has been properly repositioned to maintain the desired spatial or conformal relationship between shoe 54 and layup tool 56.

Figure 8A:
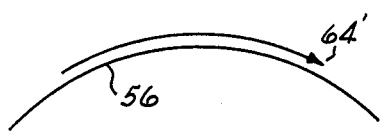
FIGS. 8A-8D are possible examples of layup tool contours and how programming might effect maintaining a desired spatial or conformal relationship between the head of FIG. 3 and the various layup tools.
Figure 8B:
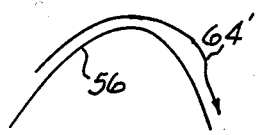

The relationship between $K_{P2}$ on the one hand and $K_{PT}$ and $K_{IT}$ on the other affects response of the system and determines a balance as to how much the Z axis servo motor, for example, will be responsive to computer change in position command signals and/or servo tracking control error signals. However, the maximum gain is preferably 1 in/min per 1/1000 FE. Hence, if TE is added in, the gain could exceed the deisred 1 in/min per 1/1000 FE. To accommodate this, the values of $K_{PT}$ and $K_{IT}$ are reduced as $K_{P2}$ increases, and vice versa. For example, $K_{P2}$, since it is related to computer change in position signals, may be set equal to zero and thus only servo tracking will control. In this situation, the values of $K_{PT}$ and $K_{IT}$ may be set as large as possible while not so large as to render the system unstable. This is advantageous because as $K_{PT}$ and $K_{IT}$ are increased, responsiveness to servo tracking increases. Thus for gently varying or less severe surfaces, for example, this tracking-only mode may be advantageously employed as shown in FIG. 8A wherein 64' indicates the path of shoe 54 as it traverses the less severe surface of layup tool 56. On the other hand, pure tracking is insufficient for more abrupt, i.e., more severe contours as shown in FIG. 8B because head 28 cannot be repositioned quickly enough as shoe 54 travels over the discontinuity at the apex of layup tool 56. In any event, the program in memory 138 will preferably be such that head 28 will decelerate in the X and/or Y axes at changes in contours, for example, to allow for some reaction time of the servo tracking control.

Figure 8C:
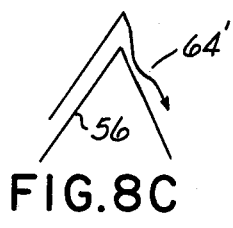
Figure 8D:

On the other hand, for more severe or abrupt contours, even slowing down movement of head 28 exclusively under program control ($K_{PT}$ and $K_{IT}=0$ and $K_{P2}=$max) may not be sufficient due to miscoordination between actual position and command positions as head 28 moves in real time (see FIG. 8C). Thus, it is desirable to have servo tracking as well. This can be accomplished as shown in FIG. 8D by reducing the value of $K_{P2}$ and increasing the values of $K_{PT}$ and $K_{IT}$ to improve transient response across discontinuities and sharp edges the locations of which are programmed into memory 138.

As the values of $K_{PT}$ and $K_{IT}$ are reduced, responsiveness of the servo tracking becomes sluggish causing the head 28 to not follow the contour of layup tool 56 as quickly as possible. Thus, it is preferred to utilize a relatively smaller value for $K_{P2}$ while utilizing values for $K_{IT}$ and $K_{PT}$ which are as large as possible. Although reducing $K_{P2}$ reduces responsiveness to change in position command signals, tracking responsiveness will improve which is especially important for severe contours. With the flexibility of computer control, it is now possible to experimentally select appropriate values for $K_{PT}$, $K_{IT}$, and $K_{P2}$ depending upon the specific contour involved.

Thus, during program control, servo tracking control is blended with computer control to more accurately maintain tracking. Similarly, free or floating tracking control may be obtained merely by setting $K_{P2}=0$ such that Z axis #CMD signals are not effective to control positioning of head 28 in the respective axis. Additionally, it is preferred to limit modifications to the value $K_{P2}$ as this value directly involves all signals which make up the VCMD portion of the drive signal. Hence, $K_{SCL}$ is provided by which only the value of FE is directly affected.

$K_{SCL}$ would typically be equal to 1.000 and thus have no affect (100% of CMD POS would be included in FE). $K_{SCL}$ could, however, be set to another value less than 1.000, for example, to reduce the value of CMD POS and FE so as to allow for larger values of $K_{P2}$ and/or $K_{PT}$ and $K_{IT}$. If $K_{SCL}$ is set to other than 1.000, the ramp up process of $K_{PT}$ and $K_{IT}$, described below, should preferably also be utilized for $K_{SCL}$ after $K_{PT}$ and $K_{IT}$ have achieved nominal values. To give an example of the relative relationship of the gain (K) factors, the factors were determined to be as follows for one embodiment:

|  | Z axis | A axis |
|---|---|---|
| $K_{gain}$ | 12.287 | 2.9 |
| $K_{P2}$ | 3.0 | 0.5 |
| $K_{PT}$ | 10.5 | 2.0 |
| $K_{IT}$ | 0.1 | .005 |

Other values may be desired or selected experimentally depending upon the particular geometry of layup tool 56.

Although not shown, it is not desirable to initially allow movement of head 28 (and, hence, execution of the program in memory 138) while in the tracking mode in response to nominal or programmed full values for $K_{PT}$ and $K_{IT}$ as this may result in transient responses. Thus, it is preferred to prevent head 28 from traversing layup tool 56 while ramping up the values of $K_{PT}$ and $K_{IT}$ until they reach their nominal or full values and thereafter to permit programmed control movement of head 28. Initially, head 28 would be placed in its working position relative layup tool 56 and $K_{PT}$ and $K_{IT}$ both set equal to 0. Thereafter, the LVDT is read, and the value of $VC_A$ determined from the tracking error TE. This value is coupled to the Z or A axis driver as appropriate to gently prod movement of head 28 until TE has settled (e.g., $VC_A$ is less than 0.001 inches). Once TE has settled, the values of $K_{PT}$ and $K_{IT}$ are each stepped up by a fixed amount and, preferably, in a desired ratio so that one does not override the other, and the above settling sequence repeated until $K_{PT}$ and $K_{IT}$ reach their nominal values and TE has again settled thus placing shoe 54 in a desired spatial or conformal relationship with the surface of layup tool 56. Thereafter program execution is permitted and the tape application sequences may begin. If $K_{SCL}$ is utilized, it is also similarly ramped up before the tape application sequence begins.

While the present invention has been illustrated by description of a preferred embodiment and while the preferred embodiment has been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicants' general inventive concept.

What is claimed is:

1. In a method of applying material to a surface, a contour of said surface characterized between less severe and more severe, by traversing said surface with a material dispensing apparatus adapted to apply said material thereto, a method of maintaining a desired spatial relationship between said material dispensing apparatus and said surface comprising:

generating a position signal indicative of a working position of said material dispensing apparatus along an axis transverse said surface;

generating a command signal correlated to (1) a following error difference between said working position and an actual position of said material dispensing apparatus along said axis and (2) a first programmable gain factor;

generating a tracking signal correlated to (1) a tracking error difference between said actual position and said surface along said axis as said material dispensing apparatus traverses said surface and (2) a second programmable gain factor;

effecting movement of said material dispensing apparatus along said axis toward said desired spatial relationship in response to said command and tracking signals;

programming said first and second programmable gain factors such that said command signal predominates over said tracking signal as said contour is chracterized as more severe; and programming said first and second programmable gain factors such that said tracking signal predominates over said command signal as said contour is characterized as less severe.

2. In the method of claim 1, said second programmable gain factor including a programmable proportionality factor and a programmable integral factor whereby said tracking signal is proportionally and integrally correlated to said tracking error difference.

3. In the system of claim 2, said proportionality factor being much larger than said integral factor.

4. A method of applying material to a surface with a material dispensing apparatus movable relative said surface along a plurality of axes in response to change in position signals input from a suitable position signal source, at least a first of said axes intersecting said surface, said material dispensing apparatus movable along said first axis in further response to changes in conformal relationship between said material dispensing apparatus and said surface, the method comprising:

(a) establishing a reference point along said first axis;
(b) positioning said material dispensing apparatus in a desired conformal relationship with said surface a first distance along said first axis from said reference point;
(c) effecting movement of said material dispensing apparatus along at least a second of said axes to thereby traverse said surface in response to a first said change in position signal wherein said material dispensing apparatus is displaceable from said reference point to a location a second distance therefrom in response to a change in conformal relationship between said material dispensing apparatus and said surface;
(d) generating a tracking signal correlated to a difference between said first and second distances;
(e) generating a positional error signal correlated to (1) a predetermined portion of a second said change is position signal and (2) a detected position of said reference point;
(f) generating a first signal correlated to said positional error signal and a gain signal;
(g) generating a second signal correlated to a predetermined portion of said tracking signal;
(h) generating a third signal correlated to a predetermined integral of said tracking signal;
(i) generating a velocity command signal correlated to said first, second and third signals;
(j) effecting movement of said reference point along said first axis in response to said velocity command signal to thereby offset said displacement so that said material dispensing apparatus will be maintained said first distance along said first axis from said reference point whereby to maintain said desired conformal relationship.

5. The method of claim 4 wherein said predetermined portion of a second change in position signal is 100 percent thereof.

6. The method of claim 4 wherein said gain signal is zero.

7. The method of claim 4 further comprising inhibiting movement of said material dispensing apparatus along said second axis while ramping said predetermined portion of said tracking signal and said predetermined integral thereof from respective start-up values to respective nominal values.

8. The method of claim 7 further comprising ramping from said respective start-up values to said respective nominal values in discrete steps, and at each said discrete step, repeating said steps (d)-(j) until said tracking signal has settled.

9. The method of claim 8, said tracking signal being settled when said third signal is less than a predetermined value.

10. The method of claim 4 wherein said first distance is zero.

11. The method of claim 4, said steps (d)-(j) occurring while said material dispensing apparatus is traversing said surface.

12. A method of applying material to a surface with a material dispensing apparatus movable relative said surface along a plurality of axes in response to change in position signals input from a suitable position signal source, at least a first and a second of said axes intersecting said surface, said material dispensing apparatus movable along said first and second axes in further response to changes in conformal relationship between said material dispensing apparatus and said surface, the method comprising:
  (a) establishing a first reference point along said first axis;
  (b) establishing a second reference point along said second axis;
  (c) positioning said material dispensing apparatus in a desired conformal relationship with said surface a first distance along said first axis from said first reference point and a second distance along said second axis from said second reference point;
  (d) effecting movement of said material dispensing apparatus along at least a third axis to thereby traverse said surface in response to a first said change in position signal wherein said material dispensing apparatus is displaceable along said first and second axes from said first and second reference points to a location a third and a fourth distance therefrom, respectively, in response to a change in conformal relationship between said material dispensing apparatus and said surface;
  (e) generating a first tracking signal correlated to a difference between said first and third distances;
  (f) generating a second tracking signal correlated to a difference between said second and fourth distances;
  (g) generating first and second positional error signals correlated to (1) first and second predetermined portions of respective further said change in position signals, respectively, and (2) first and second detected positions of said first and second reference points, respectively;
  (h) generating first and second signals correlated to respective said first and second positional error signals and respective gain signals;
  (i) generating third and fourth signals correlated to first and second predetermined portions of said first and second tracking signals, respectively;
  (j) generating fifth and sixth signals correlated to first and second predetermined integrals of said first and second tracking signals, respectively;
  (k) generating a first velocity command signal by summing said first, third and fifth signals;
  (l) generating a second velocity command signal by summing said second, fourth and sixth signals;
  (m) effecting movement of said first and second reference points along said first and second axes, respectively, in response to said first and second respective velocity command signals, respectively, to thereby offset said displacement so that said material dispensing apparatus will be maintained said first and second distances along said first and second axes, respectively, from said first and second reference points, respectively, whereby to maintain said desired conformal relationship.

13. The method of claim 12 further comprising inhibiting movement of said material dispensing apparatus along said third axis while ramping said respective predetermined portions of said respective first and second tracking signals and said respective predetermined integrals thereof from respective start-up values to respective nominal values.

14. The method of claim 13 further comprising ramping from said respective start-up values to said nominal values in discrete steps and, at each said discrete step, repeating said steps (e)-(m) until said first and second tracking signals have settled.

15. The method of claim 14, said first and second tracking signals being settled when said respective third signals are each less than respective predetermined values.

16. The method of claim 12, said steps (e)-(m) occurring while said material dispensing apparatus is traversing said surface;

17. The method of claim 12 wherein said respective predetermined portions of further said change in position signals are 100 percent thereof.

18. The method of claim 12 wherein said respective gain signals are each zero.

19. In a system for applying material to a surface, the contour of said surface characterized between less severe and more severe, with a material dispensing means adapted to apply said material to said surface as it traverses said surface, apparatus for maintaining a desired spatial relationship between said material dispensing means and said surface comprising:
  means for generating a position signal indicative of a working position of said material dispensing means along an axis transverse said surface;
  means for generating a command signal correlated to (1) a following error difference between said working position and an actual position of said material dispensing means along said axis and (2) a first programmable gain factor;
  means for generating a tracking signal correlated to (1) a tracking error difference between said actual position and said surface along said axis as said material dispensing means traverses said surface and (2) a second programmable gain factor;

means responsive to said command and tracking signals for effecting movement of said material dispensing means along said axis towards said desired spatial relationship, wherein said first and second programmable gain factors are programmed such that said command signal prevails over said tracking signal as said contour is characterized as more severe and said tracking signal prevails over said command signal as said contour is characterized as less severe, whereby to maintain said desired spatial relationship for said contour.

20. In the system of claim 19, said second programmable gain factor including a programmable proportionality factor and a programmable integral factor whereby said tracking signal is proportionally and integrally correlated to said tracking error difference.

21. In the system of claim 20, said proportionality factor being much larger than said integral factor.

22. An apparatus for applying material to a surface comprising:

a position signal source;

a material dispensing apparatus movable relative the surface along a plurality of axes, at least a first of said axes intersecting said surface, said material dispensing apparatus movable along said first axis in further response to changes in conformal relationship between said material dispensing apparatus and the surface;

means for establishing a reference point along said first axis;

means responsive to a first change in position signal from said position signal source to effect movement of said material dispensing apparatus along at least a second of said axes to thereby traverse the surface wherein said material dispensing apparatus is displaceable from said reference point to a location a second distance therefrom in response to a change in conformal relationship between said material dispensing apparatus and said surface;

means for generating a tracking signal correlated to a difference between said first and second distances;

means for generating a positional error signal correlated to (1) a predetermined portion of a second change in position signal from said position signal source and (2) a detected position of said reference point;

means for generating a first signal correlated to said positional error signal and a gain signal;

means for generating a second signal correlated to a predetermined portion of said tracking signal;

means for generating a third signal correlated to a predetermined integral of said tracking signal;

means for generating a velocity command signal correlated to said first, second and third signals;

means responsive to said velocity command signal generating means for effecting movement of said reference point along said first axis to thereby offset said displacement so that said material dispensing apparatus will be maintained said first distance along said first axis from said reference point whereby to maintain said desired conformal relationship.

23. The apparatus of claim 22 further comprising means for inhibiting movement of said material dispensing apparatus along said second axis while ramping said predetermined portion of said tracking signal and said predetermined integral thereof from respective start-up values to respective nominal values.

* * * * *